(12) United States Patent
Hux (10) Patent No.: US 9,499,104 B2
(45) Date of Patent: Nov. 22, 2016

(54) MULTIPURPOSE HITCH ACCESSORY SYSTEM

(76) Inventor: Brian Hux, Roanoke Rapids, NC (US)

( * ) Notice: Subject to any disclaimer, the term of this patent is extended or adjusted under 35 U.S.C. 154(b) by 154 days.

(21) Appl. No.: 13/562,362

(22) Filed: Jul. 31, 2012

(65) Prior Publication Data

US 2013/0033028 A1    Feb. 7, 2013

Related U.S. Application Data

(60) Provisional application No. 61/574,310, filed on Aug. 1, 2011.

(51) Int. Cl.
*B60R 9/06* (2006.01)

(52) U.S. Cl.
CPC ................................. *B60R 9/06* (2013.01)

(58) Field of Classification Search
CPC ............. B60R 9/06; B60R 9/00; B60R 9/08; B60R 9/10; B60R 9/12; B60R 9/045; B60R 9/048; B62H 3/00; B62H 3/04; B62H 3/06; B62H 3/08; B62H 3/10; B62H 3/12
USPC .............. 280/769, 762, 727; 224/495, 502, 224/504–508, 519, 531, 532, 924; 211/18, 211/19, 21, 22, 17; 296/26.08–26.1; D12/407, 408
See application file for complete search history.

(56) References Cited

U.S. PATENT DOCUMENTS

| | | | | |
|---|---|---|---|---|
| 4,915,276 A * | 4/1990 | Devito | ........................... | 224/521 |
| 5,649,656 A * | 7/1997 | Davy | ........................... | 224/405 |
| 5,678,743 A * | 10/1997 | Johnson et al. | .............. | 224/485 |
| 5,680,976 A * | 10/1997 | Koliopoulos et al. | ........ | 224/524 |
| 5,842,615 A * | 12/1998 | Goodness | .................... | 224/509 |
| 5,881,937 A * | 3/1999 | Sadler | ........................ | 224/509 |
| 5,938,092 A * | 8/1999 | Johnson | ....................... | 224/521 |
| 5,950,617 A * | 9/1999 | Lorenz | ......................... | 224/488 |
| 6,125,480 A * | 10/2000 | Soffar et al. | .................. | 224/519 |
| 6,722,380 B1 * | 4/2004 | Hafer | ......................... | 280/415.1 |
| 6,775,860 B2 * | 8/2004 | Unruh | .......................... | 224/519 |
| 6,808,231 B1 * | 10/2004 | Hill | ............................. | 297/217.7 |
| 7,073,857 B1 * | 7/2006 | Bailey | ........................ | 297/217.7 |
| 7,090,104 B2 * | 8/2006 | Dorety | ......................... | 224/519 |
| 7,195,270 B2 * | 3/2007 | Norquay | ................... | 280/491.5 |
| 7,591,404 B2 * | 9/2009 | LeDuc et al. | ................ | 224/509 |
| 7,819,128 B2 * | 10/2010 | Clark et al. | ................ | 280/491.1 |
| 8,657,167 B2 * | 2/2014 | Horyna | ...................... | F41J 9/20 224/282 |
| 8,800,831 B2 * | 8/2014 | Gray | ............................ | 224/532 |
| 8,800,832 B2 * | 8/2014 | Niemi | .......................... | 224/545 |
| 8,814,209 B1 * | 8/2014 | Way | .............................. | 280/769 |
| 8,820,598 B2 * | 9/2014 | Tennyson et al. | ........... | 224/509 |
| 8,998,047 B2 * | 4/2015 | DeMers et al. | .............. | 224/310 |
| 9,175,497 B1 * | 11/2015 | Poudrier | ..................... | E04H 15/06 |
| 9,333,822 B1 * | 5/2016 | LaFave | ..................... | B60R 9/10 |
| 2001/0042985 A1 * | 11/2001 | Hodge | ........................ | 296/26.08 |
| 2004/0012170 A1 * | 1/2004 | McCoy | ........................ | 280/495 |
| 2004/0232185 A1 * | 11/2004 | Darby | ....................... | B60R 9/06 224/521 |
| 2008/0231029 A1 * | 9/2008 | Hummel | ...................... | 280/769 |
| 2010/0294819 A1 * | 11/2010 | Spera | ....................... | B60R 9/06 224/519 |
| 2013/0264367 A1 * | 10/2013 | Hill | .......................... | B60R 9/10 224/413 |

\* cited by examiner

*Primary Examiner* — James M Dolak (57) ABSTRACT

A hitch accessory system is provided. The system includes a crossbar having a perpendicular bar and parallel bar. The system further includes a crossbar insert capable of supporting at least one accessory. The perpendicular bar is capable of receiving and supporting the crossbar insert. The parallel bar is adapted to engage a hitch.

7 Claims, 15 Drawing Sheets

MULTIPURPOSE HITCH ACCESSORY SYSTEM

CROSS-REFERENCE TO RELATED APPLICATIONS

This application claims priority to U.S. Provisional Application No. 61/574,310, filed Aug. 1, 2011.

FIELD OF THE INVENTION

The present invention relates to a multipurpose accessory system designed to be inserted into a vehicle hitch.

BACKGROUND OF THE INVENTION

Various passenger vehicles including trucks and sport utility vehicles include trailer hitches for towing a trailer, boat, or other work-related to recreational apparatus. Most commonly, the trailer hitch includes a generally tubular receiver in an assembly attached to the vehicle that is capable of receiving a similarly shaped tongue that typically includes a mounting ball for engaging a trailer. In addition to serving as a means for towing, trailer hitches more recently have started serving as a means for mounting various accessories including cargo carriers and grills. Such accessories are particularly suitable for recreational activities including camping and tailgating at sporting events. Existing hitch systems are limited, however, in that no single hitch system provides a platform for attaching various recreational or work-related components.

SUMMARY OF THE INVENTION

The present invention provides a multipurpose system that attaches to a hitch and provides a platform for various accessories or components for various activities. According to one aspect, the system includes a crossbar having a perpendicular bar and parallel bar. The system further includes crossbar insert capable of supporting at least one accessory. The perpendicular bar is capable of receiving and supporting the crossbar insert. The parallel bar is adapted to engage a hitch. The parallel bar includes a surface defining a recess capable of receiving a hitch safety pin for securing the crossbar within a hitch. The perpendicular bar includes a surface defining a recess capable of receiving a hitch safety pin for securing a seat sleeve member, a grill support member, or an accessory support system. The accessory support system includes a tubular member attached to a coupling. The coupling is adapted to engage the perpendicular bar of the cross bar or the crossbar insert and the tubular member is adapted to support an accessory selected from the group consisting of an umbrella, table and fishing rod. The parallel bar includes a plurality of surfaces defining a recess capable of aligning with a corresponding surface defining a recess within the accessory support system. The recesses are capable of receiving a hitch safety pin.

According to one embodiment, the accessory is a cargo rack. The cargo rack includes a first sleeve, a second sleeve, and a coupling. The first and second sleeve are adapted to engage the crossbar insert. The parallel bar includes a plurality of surfaces defining a recess capable of aligning with a corresponding surface defining a recess on the coupling of the cargo rack. The recesses are capable of receiving a hitch safety pin. Other suitable accessories include at least one seat, umbrella, grill, fishing rod, table, fishing rod holder, foot rest or a combination thereof.

According to one embodiment, the grill includes a grill mounting member capable of engaging a grill support member. The grill support member is secured to a swivel member. The swivel member is secured to a sleeve member adapted to engage the crossbar insert.

According to one embodiment, the at least one seat includes a mounting member on an underside of the seat. The mounting member is adapted to engage a swivel member secured to a seat sleeve member. The seat sleeve member is adapted to engage the crossbar insert.

According to one embodiment, the crossbar and crossbar insert are manufactured from steel, aluminum, or a combination thereof. The parallel bar of the crossbar is typically between about 20 inches and 60 inches in length. The perpendicular bar of the crossbar is typically between about 10 inches and 30 inches in length.

DETAILED DESCRIPTION OF THE INVENTION

The present invention provides a multipurpose hitch assembly system which includes a variety of accessories that may be used in conjunction with a vehicle's hitch. The present system is particularly suitable for use during work-related and recreational activities and for cargo storage. Such recreational activities include camping, fishing, and tailgating at sporting events. The present system provides the convenience of having a single hitch assembly capable of quickly and efficiently receiving a variety of accessories as disclosed herein. By providing a single hitch assembly, a user can easily swap out, interchange and combine accessories depending on the user's chosen activity. The assembly system is capable of use in hitches of various standard sizes that may be attached to various vehicles including, but not limited to, sport utility vehicles, trucks, passenger vehicles (e.g., sedan or coupe), tow trucks, and all-terrain vehicles.

Figure 1:
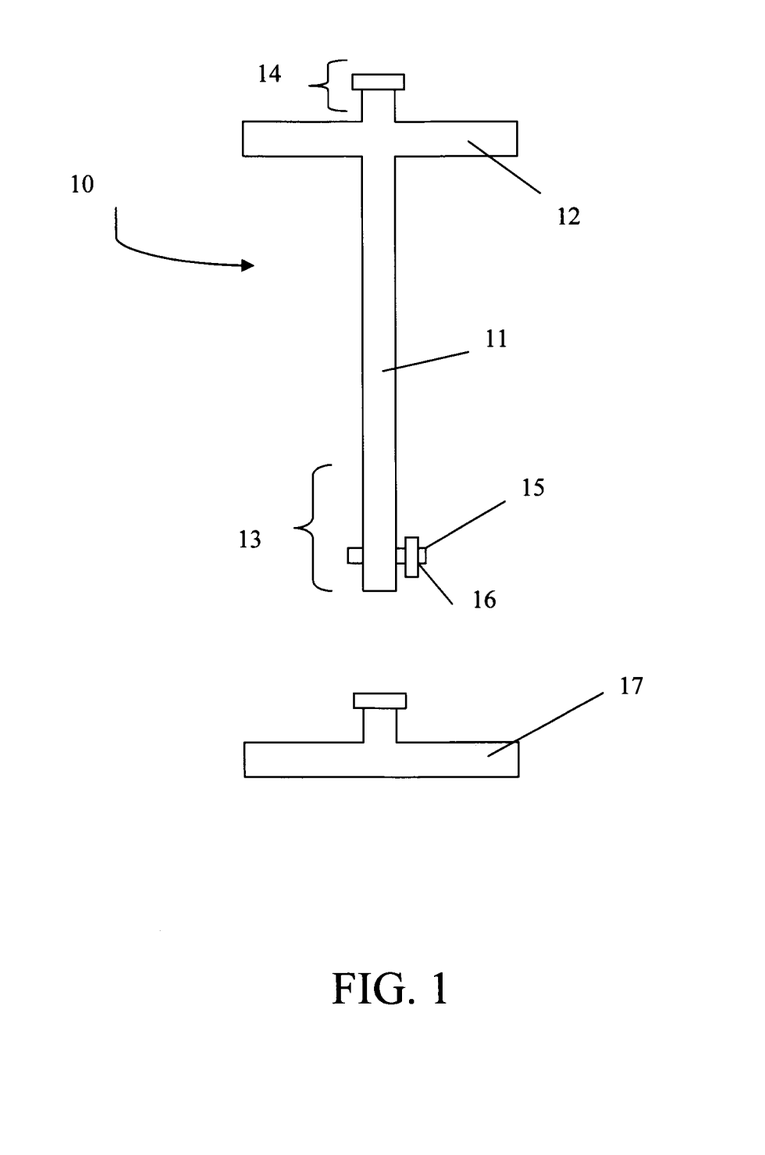
FIG. 1 is a top view of a crossbar according to one embodiment.

The hitch assembly system includes at least one crossbar. FIG. 1 provides a top view of a crossbar 10 according to one embodiment. The crossbar 10 is substantially in the shape of a cross which includes a parallel bar 11 and perpendicular bar 12. The crossbar 10 includes a proximal end 13 that is capable of engaging a trailer hitch receptacle 17 affixed to a vehicle. The proximal end 13 may be sized such that the proximal end 13 engages trailer hitches of various sizes such as, for example, 1.5 inches, 2.0 inches, or 2.5 inches. The crossbar also includes a distal end 14 capable of engaging a tongue which, in turn, may be used to engage a ball assembly capable of hauling a trailer or engage yet another crossbar 10. Thus, multiple crossbars 10 may be attached in a series to create a matrix of hitch assembly systems. The distal end 14 further includes a surface defining a recess capable of receiving a safety pin 15. In use, the proximal end 13 is inserted in a hitch receptacle and secured with the safety pin 15. A second pin 16, such as a cradle pin, is inserted in the safety pin 15 to secure the safety pin 15 within the hitch receptacle. The safety pin 15 and cradle 16 are manufactured from a material such as steel, aluminum, or other material capable of securing the crossbar to the vehicle hitch.

The crossbar is manufactured from a material capable of supporting the accessories and associated weight of cargo (including persons). According to a preferred embodiment, the crossbar is manufactured from steel or aluminum. The crossbar may be painted or powder coated for further strength and enhanced appearance. The crossbar is substantially square in shape, although various shapes may be utilized including substantially round or rectangular. The crossbar is substantially tubular in that the crossbar is hollow with walls that are of a thickness that is capable of providing the requisite support as discussed herein. The thickness or gauge of the crossbar walls may vary according to the size of the trailer hitch receptacle and loading or towing capacity, however, the walls are typically about 3/16 inch.

The dimensions of the crossbar may vary but is overall dimensioned so as to provide the requisite space and support for the accessories disclosed herein. According to one embodiment, the parallel bar of the crossbar is typically between about 20 inches and 60 inches in length. According to a preferred embodiment, the parallel bar of the crossbar is typically between about 30 inches and 50 inches in length. According to a particularly preferred embodiment, parallel bar of the crossbar is typically about 40 inches in length. According to one embodiment, the perpendicular bar of the crossbar is typically between about 10 inches and 30 inches. According to a preferred embodiment, the perpendicular bar of the crossbar is typically between about 15 inches and 25 inches. According to a particularly preferred embodiment, the perpendicular bar of the crossbar is typically about 16 inches. According to one embodiment, the width and height of the parallel and perpendicular bars is typically about two inches which allows for engaging of a typical trailer hitch receiver, although the width and height may vary.

Figure 2A:
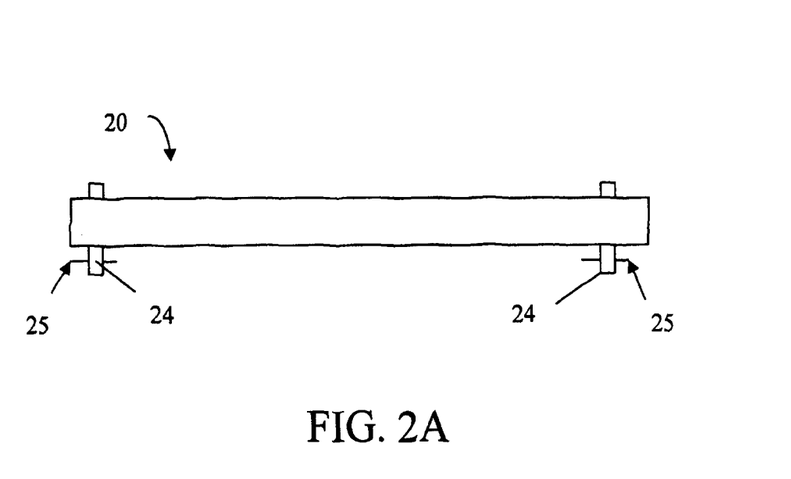
FIG. 2A is a top view of a crossbar insert according to one embodiment.
Figure 2B:
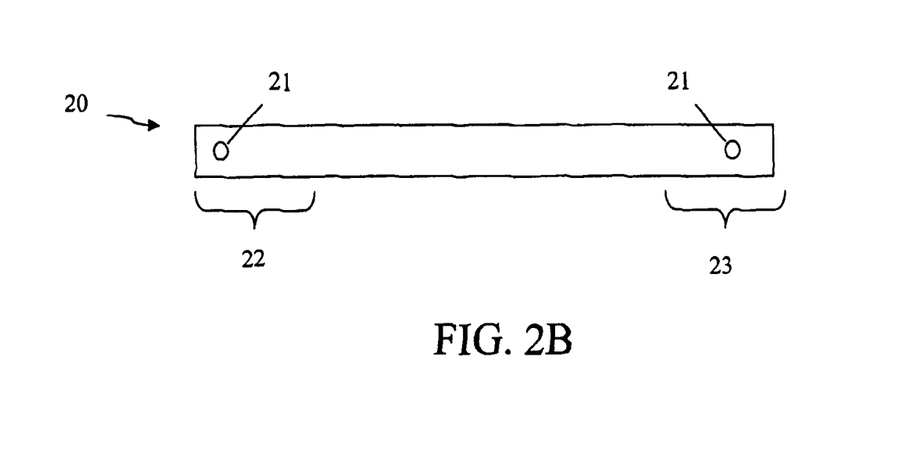
FIG. 2B is a front view of a crossbar insert according to one embodiment.

The hitch assembly further includes a crossbar insert. FIG. 2A provides a top view of one embodiment of a crossbar insert 20. FIG. 2B provides a side view of the crossbar insert 20. As illustrated, the crossbar insert 20 includes at least one recess 21 at each of a first distal end 22 and second distal end 23. The recess 21 is capable of receiving a hitch receiver safety pin 24. The hitch receiver safety pin is, in turn, capable of receiving a cradle safety pin 25. The hitch receiver safety pin 24 and cradle safety pin 25 are manufactured from a material such as steel, aluminum, or other material capable of securing the crossbar to the crossbar insert 20. Like the crossbar, the crossbar insert 20 is manufactured from a material capable of supporting the accessories and associated weight of cargo (including persons). According to a preferred embodiment, the crossbar insert 20 is manufactured from steel or aluminum.

Figure 3A:
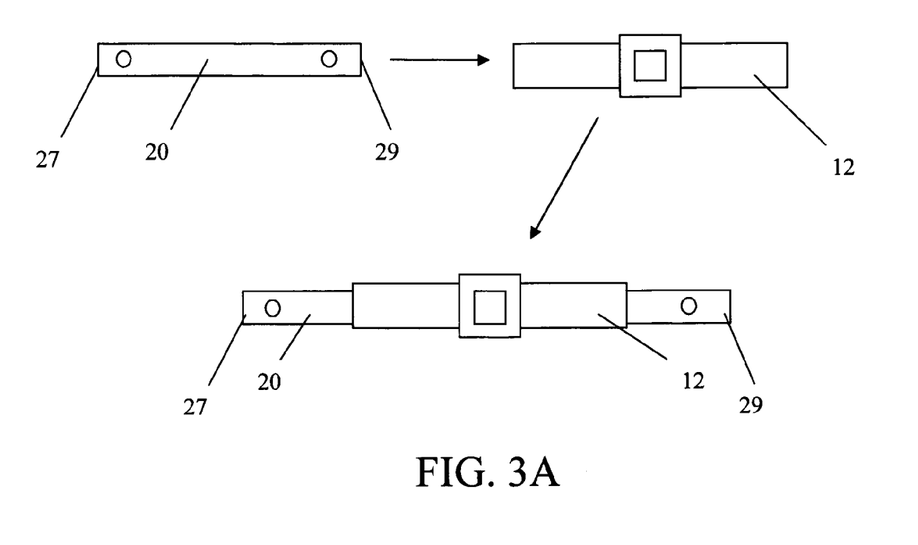
FIG. 3A is a front view of the engagement process of a crossbar insert within a crossbar according to one embodiment.
Figure 3B:
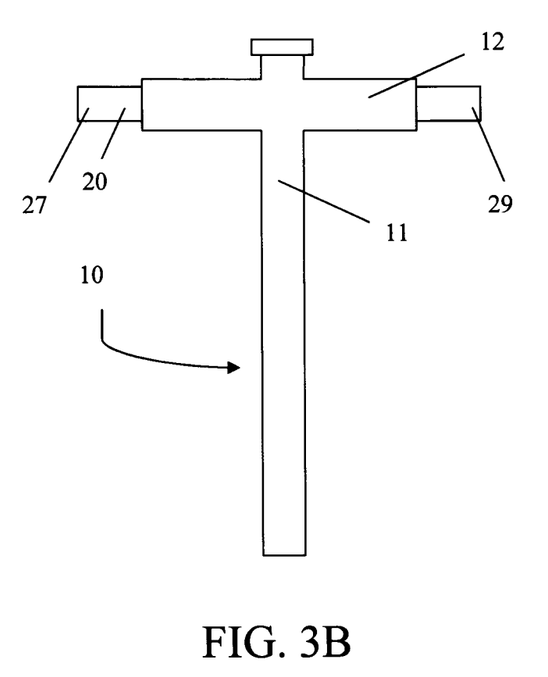
FIG. 3B is a top view of a crossbar with the crossbar insert engaged according to one embodiment.
Figure 3C:
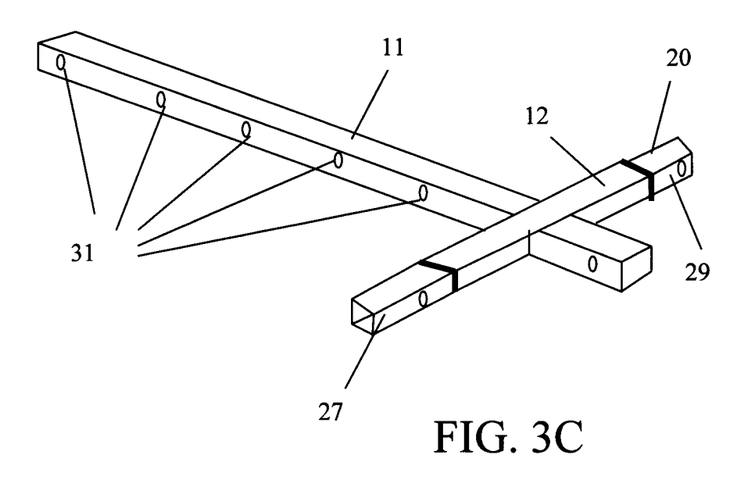
FIG. 3C is a perspective view of a crossbar with the crossbar insert engaged according to one embodiment.

As illustrated in the front view of FIGS. 3A, 3B and 3C, the crossbar insert 20 is of substantially the same shape as the perpendicular bar of the crossbar 10. The crossbar insert 20 is sized to easily engage or slide into the perpendicular bar 12 of the crossbar 10 such that a first end 27 and second end 29 extend beyond each end of the perpendicular bar 12 of the crossbar 10. According to one embodiment, the crossbar insert 20 is typically between about 35 inches to about 60 inches in length. According to a preferred embodiment, the crossbar insert 20 is typically between about 42 inches to about 54 inches in length. According to a particularly preferred embodiment, the crossbar insert 20 is typically about 48 inches in length. Once engaged, the crossbar insert 20 rests inside the perpendicular bar 12 of the crossbar 10 as illustrated in the top view of FIG. 3B and perspective view of FIG. 3C. The parallel bar 12 includes a plurality of surfaces defining recesses 31.

Figure 4A:
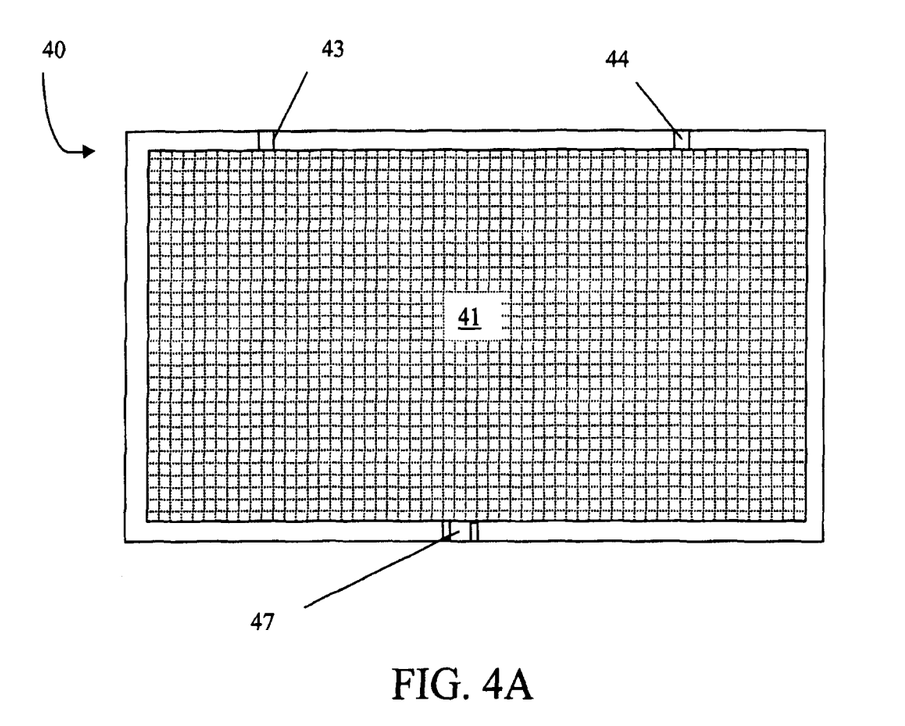
FIG. 4A is a bottom view of a cargo basket according to one embodiment.
Figure 4B:
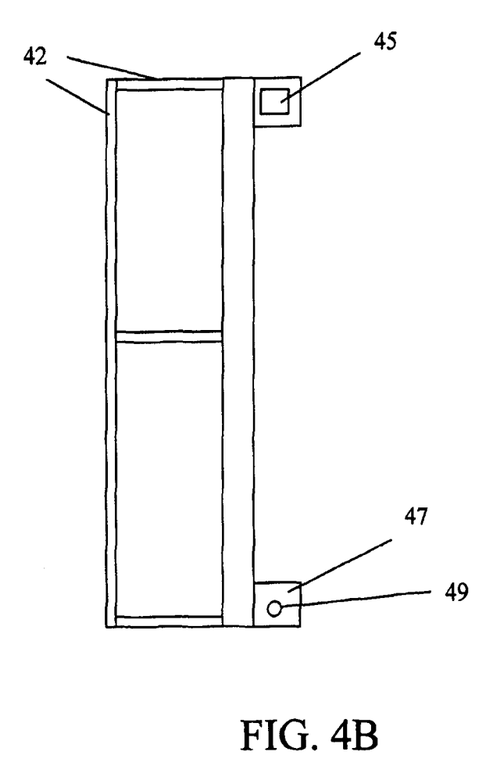
FIG. 4B is a side view of a cargo basket according to one embodiment.
Figure 4C:
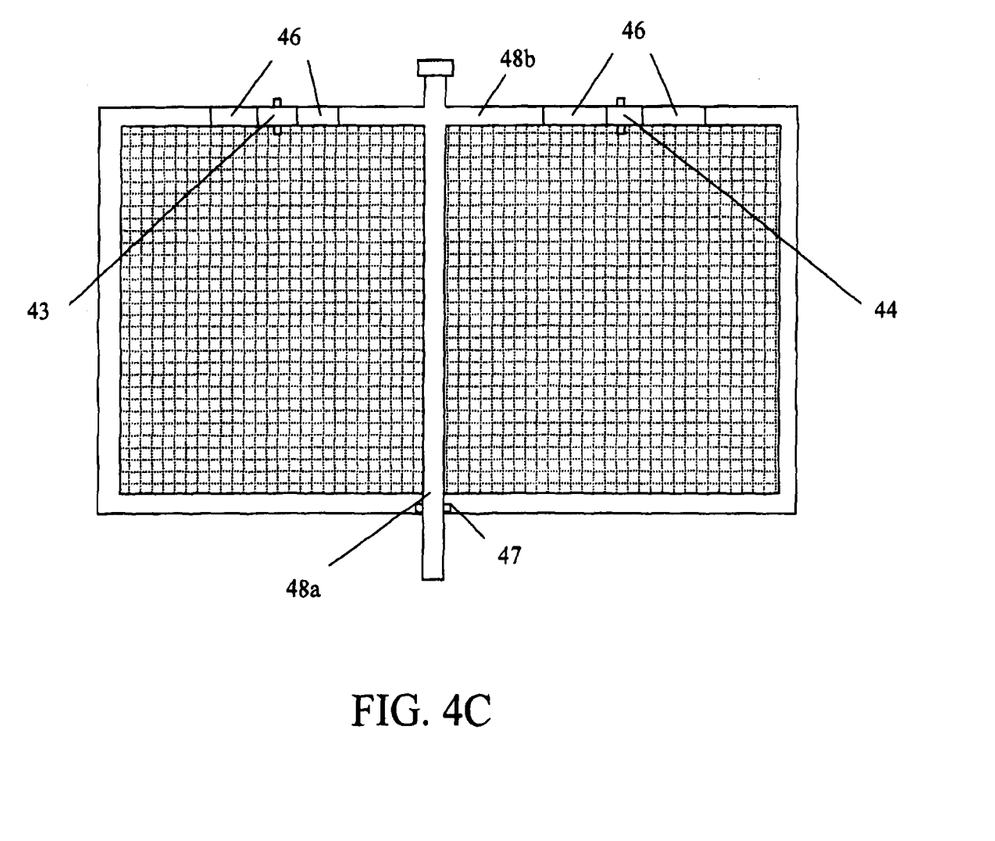
FIG. 4C is a bottom view of a cargo basket engaged with a crossbar according to one embodiment.
Figure 5A:
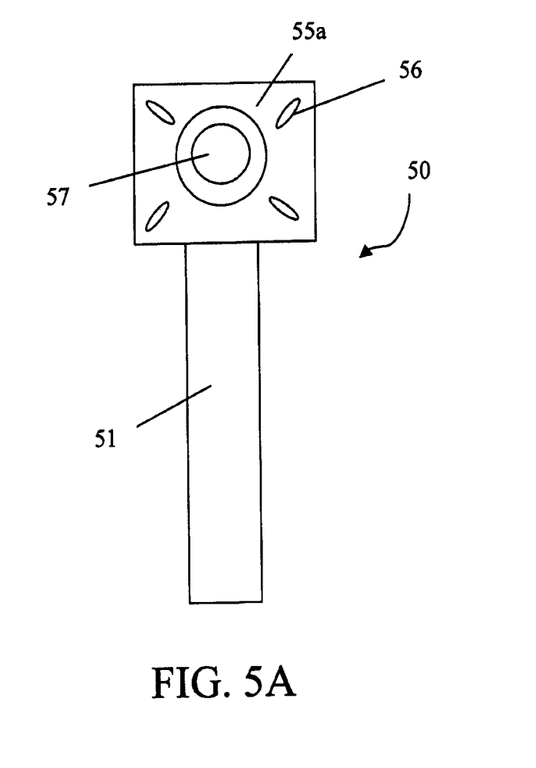
FIG. 5A is a top view of a seat support system according to one embodiment.
Figure 5B:
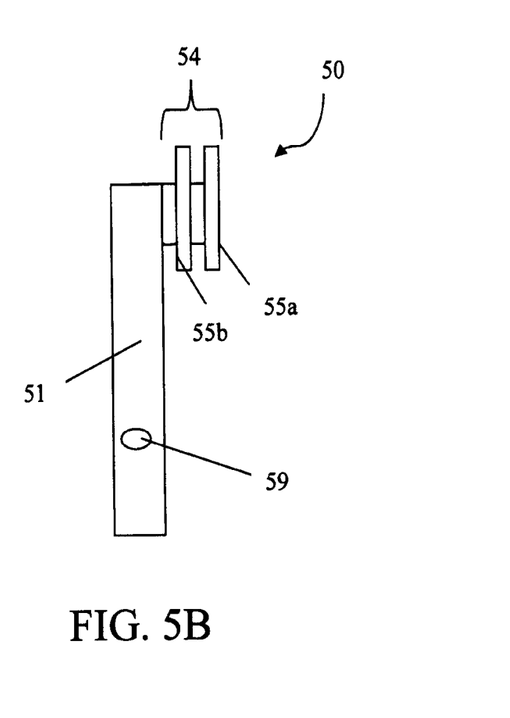
FIG. 5B is a side view of a seat support system according to one embodiment.
Figure 5C:
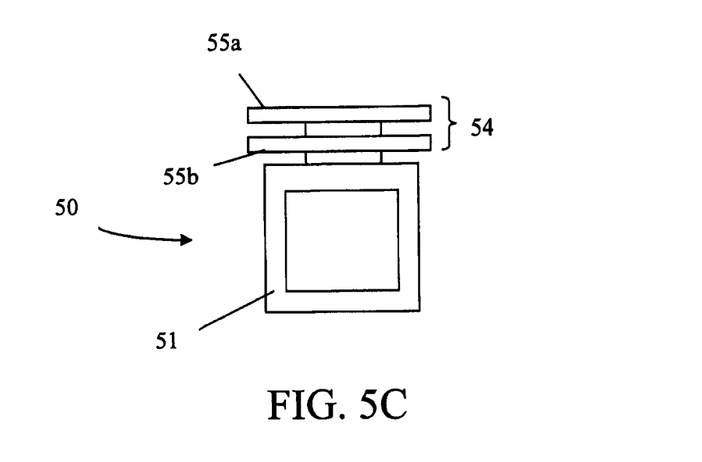
FIG. 5C is a bottom view of a seat support system according to one embodiment.
Figure 5D:
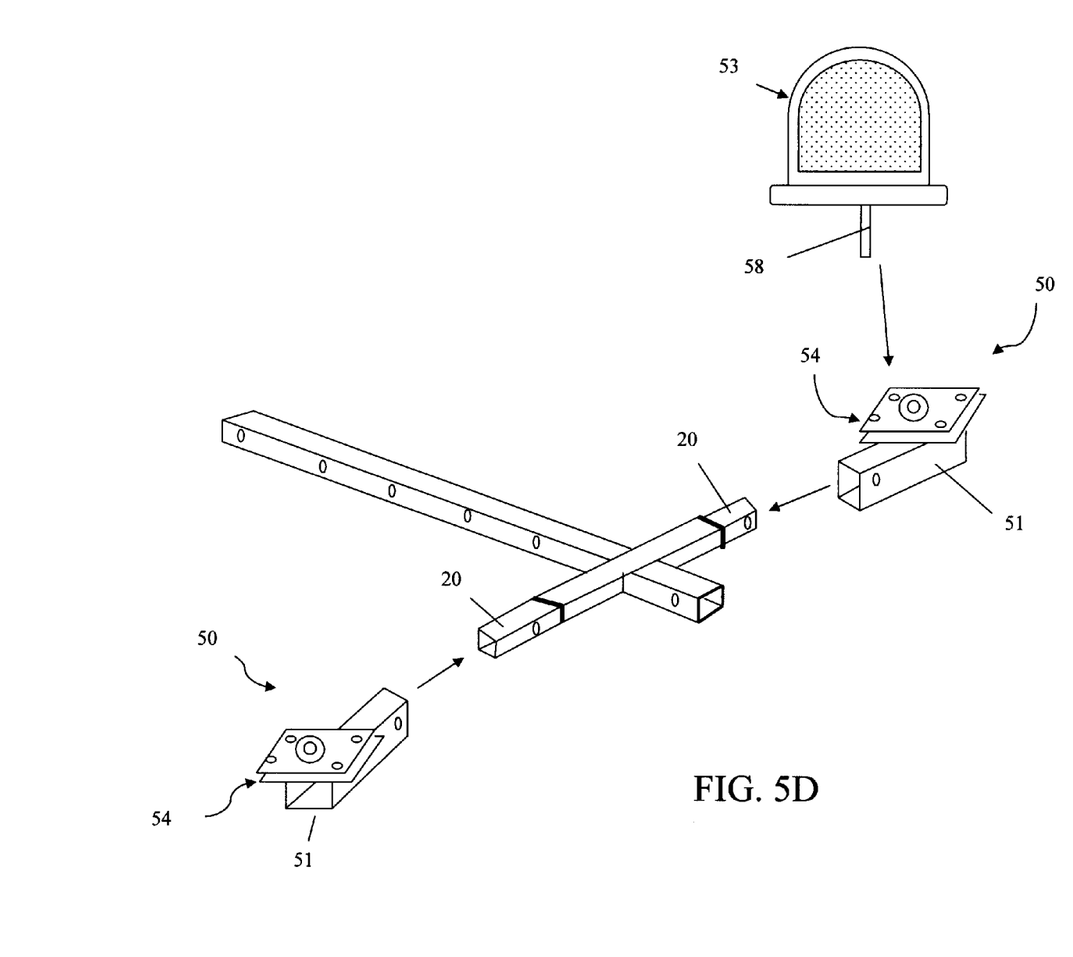
FIG. 5D is a perspective view of a seat support system according to one embodiment.

The hitch assembly system provided herein is capable of engaging, receiving, and supporting a variety of accessory systems for a variety of activities. One or more of the accessories as described herein may be used in various combinations with one another depending on the activity chosen by the user. According to one embodiment, one accessory is a cargo rack or basket that is capable of engaging the crossbar (see FIGS. 4A, 4B, and 4C). The bottom view of one embodiment of a cargo rack 40 is illustrated in FIG. 4A. The cargo rack 40 is manufactured from a material capable of supporting a variety of consumer goods or products such as, for example, luggage or camping equipment. According to a preferred embodiment, the cargo rack 40 is manufactured from a metal such as, for example, steel or aluminum. As illustrated, the cargo rack 40 includes a metal mesh or screen 41 as a flooring and may further include rails or supports 42 (see FIG. 4B) to aid in retaining cargo within the rack 40. The cargo rack 40 includes at least a first sleeve 43 and second sleeve 44. Each sleeve (43, 44) includes a surface defining a recess 45 capable of engaging the crossbar insert 46. The cargo rack 40 further includes an open-ended coupling 47 capable of resting on top of the parallel bar 48a of the crossbar. The coupling 47 includes a surface defining a recess 49 that aligns with at least one recess or opening within the parallel bar of the crossbar. Once the respective recesses are aligned, the coupling 47 receives a safety pin and cradle for securing the cargo rack 40 to the parallel bar 48a. Once the coupling 47 is aligned and secured, the crossbar insert 46 may be slid through the first sleeve 43, the perpendicular bar 49b of the crossbar, and the second sleeve 44. A safety pin and cradle pin can then be inserted in the respective recesses (e.g., 45) to secure the front portion of the cargo rack 40 to the crossbar insert 46. The coupling 47 and sleeves (43, 44) are manufactured from a material such as, for example, steel, aluminum or other material capable of engaging and securing a loaded cargo rack 40 to the parallel bar 48a of the crossbar and crossbar insert 46. The cargo rack 40 may also include a ramp (not shown) for loading an all-terrain vehicle.

According to another embodiment, the present hitch assembly system is capable of supporting one or more seats or chairs. The ability to support one or more seats is particularly useful when attending tailgating events, fishing, resting at a park or at the beach, or other outdoor activity that enables the user to rest in a seat. As illustrated in FIGS. 5A, 5B, 5C and 5D, the crossbar insert is capable of receiving and supporting two seat support systems 50. All components of the seat support system as disclosed herein may be manufactured from a material capable of supporting the required components as well as the weight of all accessories, the seat, and weight of at least two adults. According to a preferred embodiment, all components of the seat support system are manufactured from steel, aluminum, or a combination thereof. The seat support system 50 includes a substantially square seat sleeve member 51 having a recess at a proximal end that is appropriately sized and capable of sliding over the crossbar insert 20. Each seat sleeve member 51 is manufactured from a material such as, for example, steel, aluminum or other material capable of engaging and securing to the crossbar insert 20 and supporting the weight of a seat 53 and user. The seat sleeve member 51 also includes a distal end which has a swivel member 54 attached thereto. The swivel member 54 includes a first plate 55a and second plate 55b each having a front face and a surface defining at least four recesses 56 for receiving attachment members (e.g., screws, bolts) (FIG. 5A) and at least one surface defining a center recess 57 capable of receiving a mounting member 58 that extends from an underside of a seat 53. In an alternative embodiment (not shown), the mounting member 58 may directly engage a vertical recess located in the crossbar or crossbar insert 20. The seat sleeve member 51 further includes a surface defining a recess 59 for receiving a safety pin. Once the seat sleeve member 51 engages the crossbar insert 20, a safety pin may be inserted in the recess 59 to secure the seat support system 50 to the crossbar insert 20.

Figure 6A:
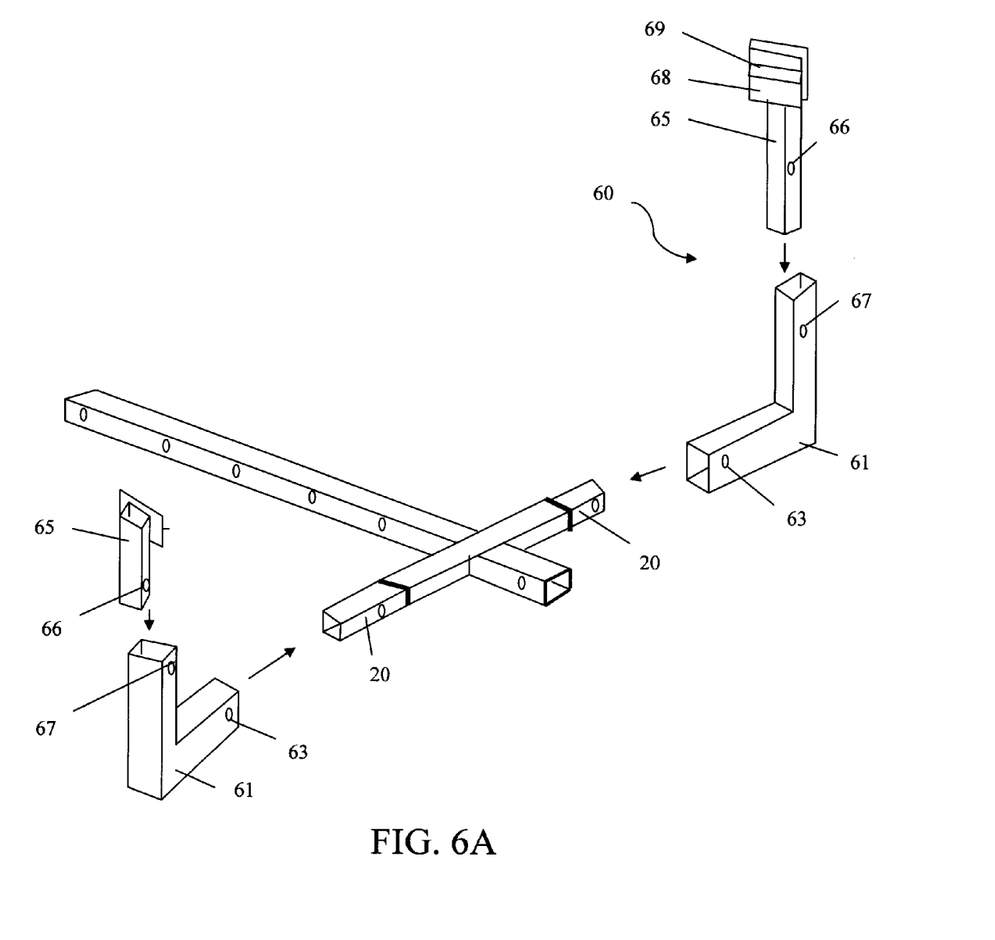
FIG. 6A is a perspective view of a grill mounting system according to one embodiment.
Figure 6B:
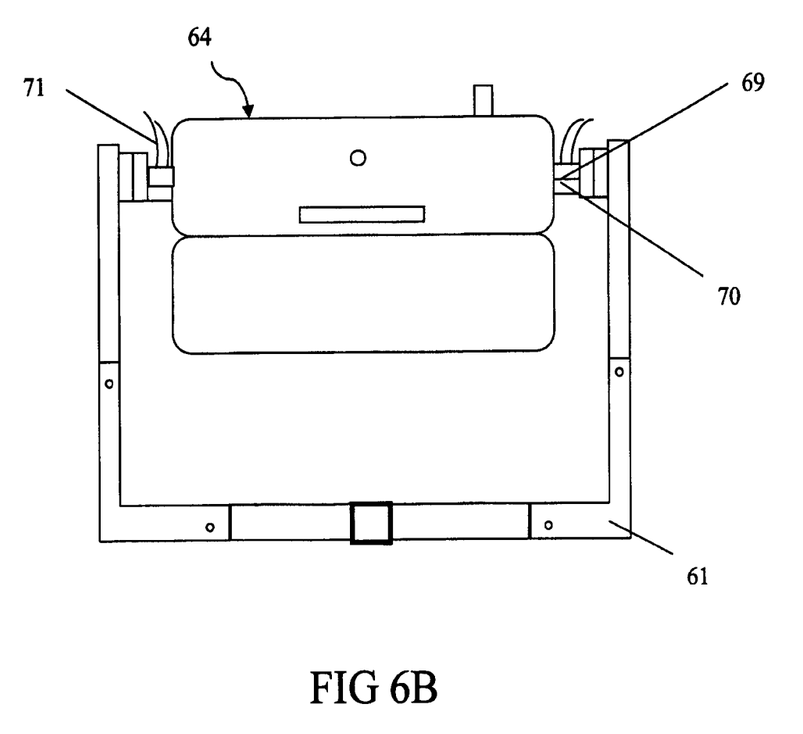
FIG. 6B is a front view of a grill mounting system according to one embodiment.

According to another embodiment, the present hitch assembly is capable of supporting at least one grilling apparatus. One embodiment of a grill mounting system 60 is illustrated in FIG. 6A and FIG. 6B. Referring to the perspective view of FIG. 6A, the illustrated embodiment of the grill mounting system 60 includes two elbow sleeves 61. Each elbow sleeve 61 is substantially square in shape and includes a first end of a size capable of sliding over or engaging with the crossbar insert 20. At least one surface defining a recess 63 is located near the first end of the elbow sleeve 61 which is capable of aligning with the corresponding recess in the crossbar insert 20. Once aligned, a safety pin may be inserted thereby securing the elbow sleeve 61 over the crossbar insert 20. Each elbow sleeve 61 is manufactured from a material such as, for example, steel, aluminum or other material capable of engaging and securing to the crossbar insert 20 and supporting the weight of a grill 64 (FIG. 6B). Each elbow sleeve 61 further includes a second end capable of receiving a swivel support member 65. Each swivel support member 65 includes at least one surface defining a recess 66 capable of aligning with a corresponding recess 67 located in the second end of the elbow sleeve 61. Once aligned, a safety pin may be inserted thereby securing the swivel support member 65 within the elbow sleeve 61. Each elbow sleeve 61 also includes a second end capable of receiving a swivel support member 65. Each swivel support member 65 includes a swivel member 68 which includes a grill mounting member 69. The grill mounting member 69 is capable of engaging a grill support member 70 which is mounted on either side of the grill 64. The grill support member 70 may also include a handle 71 to aid in grill movement and leveling. The swivel support member 65, swivel member 68, and grill mounting member 69 are each manufactured from a material such as, for example, steel, aluminum or other material capable of supporting a grill.

Figure 7:
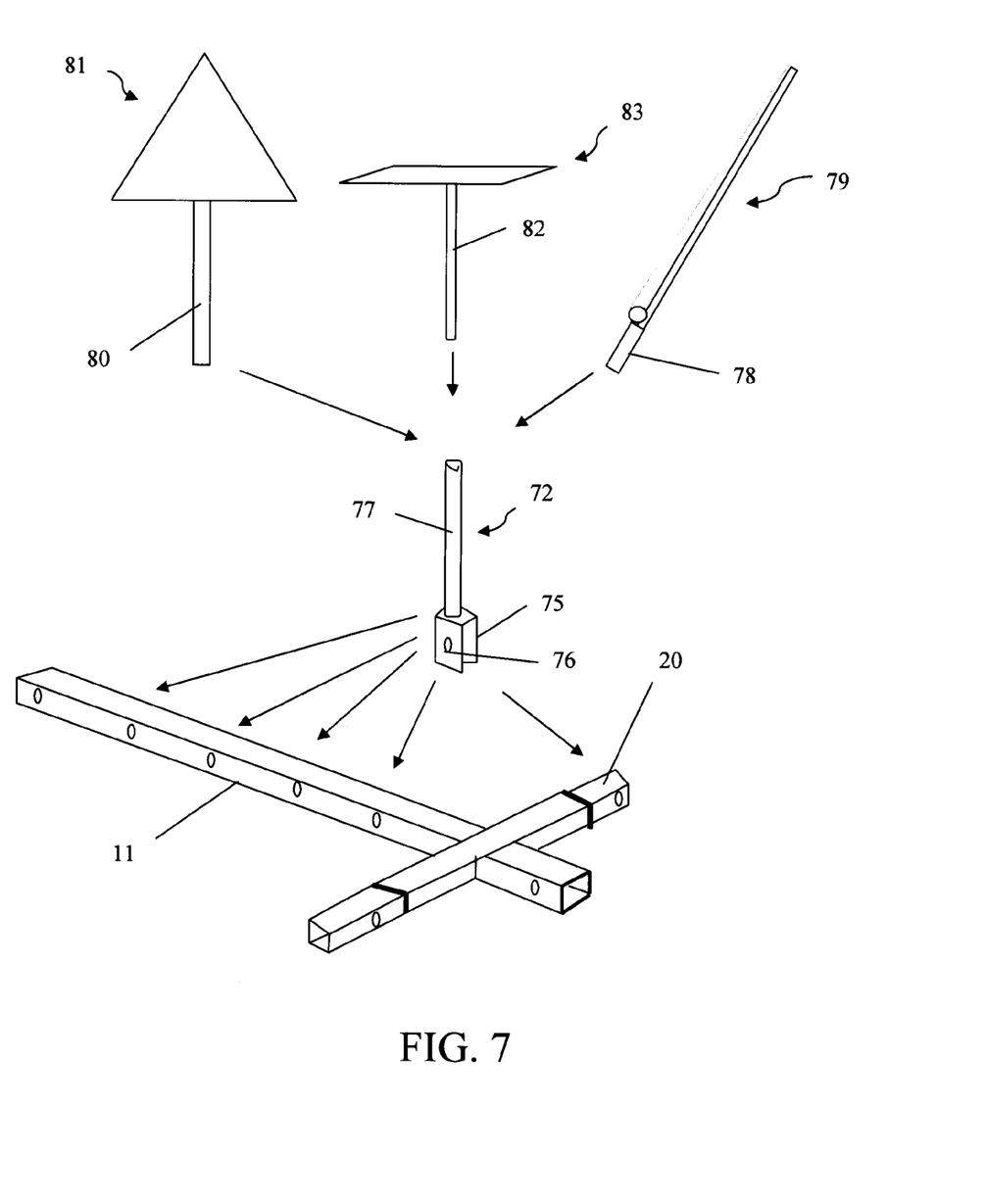
FIG. 7 is a perspective view of an accessory system according to one embodiment.

According to another embodiment, the present hitch assembly is capable of supporting at least one other accessory such as a table, umbrella or fishing rod or a combination thereof. Referring to FIG. 7, an accessory support member 72 may be mounted in a variety of positions on the parallel bar 11 of the crossbar as well as on the crossbar insert 20. The accessory support member 72 includes a coupling 75 capable of engaging the parallel bar 11 of the crossbar or the crossbar insert 20. The coupling 75 includes a surface defining a recess 76 capable of receiving a safety pin. Thus, once the coupling 75 engages the parallel bar 11 of the crossbar and is aligned with the respective recess on the parallel bar 11 of the crossbar or the crossbar insert 20, a safety pin may be inserted through the respective recesses to secure the accessory support 72. The accessory support 72 further includes a tubular member 77 capable of receiving the handle 78 of a fishing rod 79, the support pole 80 of an umbrella 81, or a table support member 82 of a table 83. The tubular member 77 may be substantially round in shape or may be manufactured in a variety of shapes capable of supporting an accessory as described herein. The tubular member 77 may also include a horizontal recess (not shown) adapted to receive a screw for securing the umbrella within the tubular member. The tubular member 77 and coupling 75 are manufactured from a material capable of supporting an accessory as described herein. In a preferred embodiment, the tubular member 77 and coupling 75 are manufactured from a material such as, for example, steel or aluminum.

Figure 8:
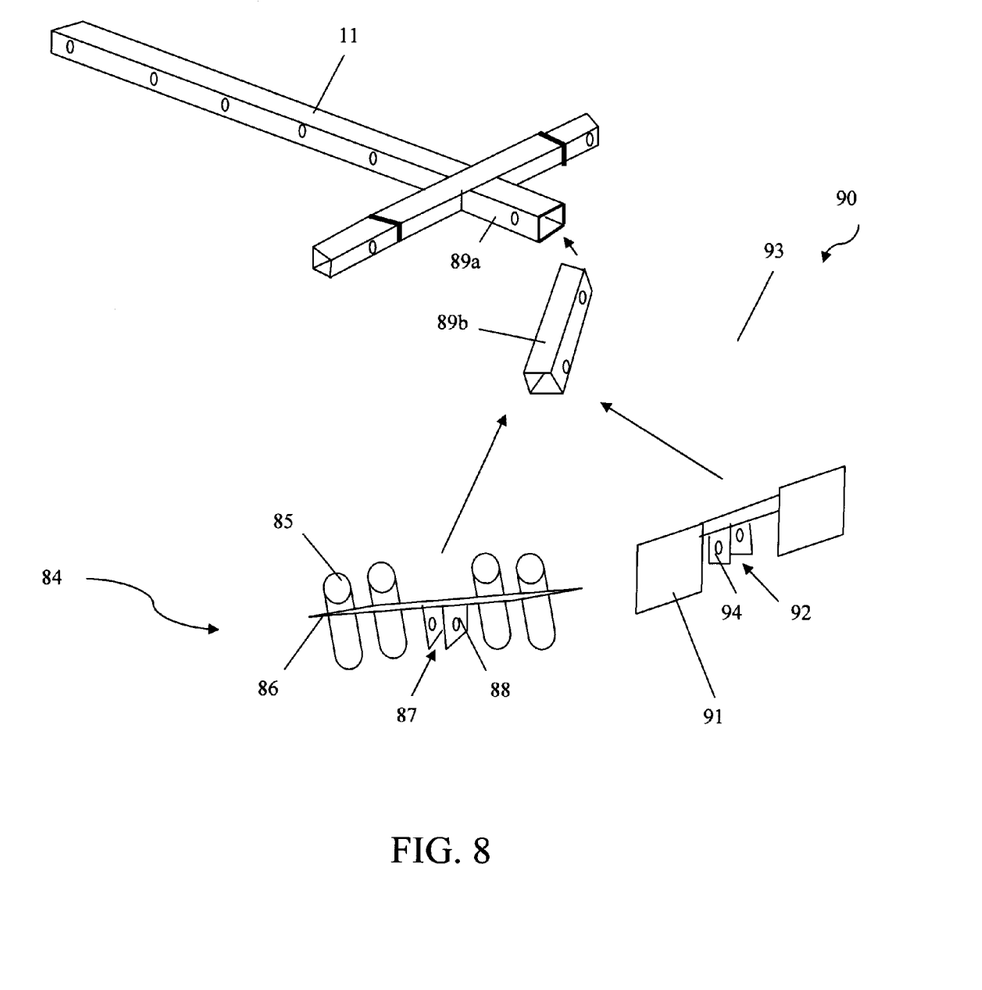
FIG. 8 is a perspective view of an accessory system according to an alternative embodiment.

Referring to FIG. 8, an alternative embodiment of a fishing rod holder and foot rest are illustrated. The fishing rod holder 84 includes a plurality of tubes 85 capable of receiving a fishing rod (not shown) mounted on a rod holder support member 86. The fishing rod holder 84 further includes a coupling 87 having a surface defining a recess 88 capable of receiving a safety pin. The tubes 85, support member 86 and coupling 87 may be manufactured from any material capable of support a fishing rod including, but not limited to, plastic, steel, or aluminum. In use, the fishing rod holder 84 is mounted on a crossbar extension 89b which is, in turn, engaged in a distal end of the crossbar 89a. The crossbar extension 89b is secured to the distal end of the crossbar 89a by a safety pin. The fishing rod holder 84 is secured to the crossbar extension 89b by a safety pin. The illustrated embodiment of the foot rest 90 includes at least two foot support platforms 91 connected to a coupling 92 by a connecting member 93. The coupling 92 includes a surface defining a recess 94 capable of receiving a safety pin. In use, the foot rest 90 is mounted on a crossbar extension 89b which is, in turn, engaged in a distal end of the crossbar 89a. The crossbar extension 89b is secured to the distal end of the crossbar 89a by a safety pin. The foot rest 90 is secured to the crossbar extension 89b by a safety pin. When not in use, the fishing rod holder 84 and foot rest 90 may be relocated and secured for transportation at a point with a safety pin via one of the recesses on the perpendicular bar 11.

Figure 9:
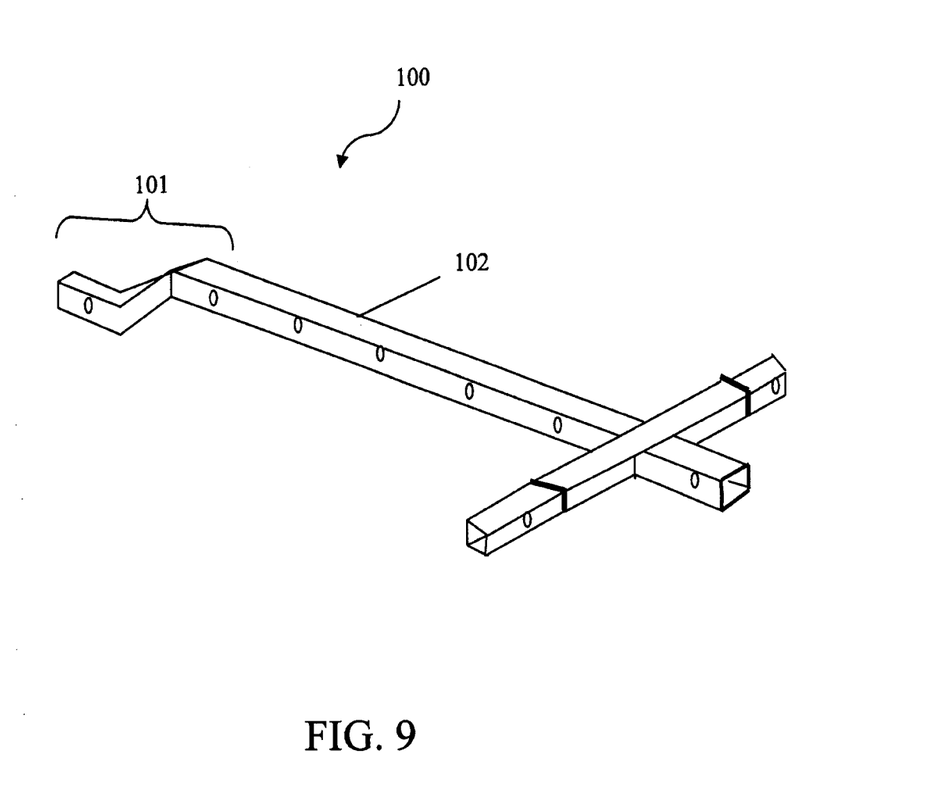
FIG. 9 provides a perspective view of an alternative embodiment of a crossbar.

FIG. 9 provides a perspective view of an alternative embodiment of a crossbar. The crossbar 100 includes a proximal end 101 adapted to engage a hitch receptacle affixed to a vehicle. The proximal end 101 may be of substantially the same shape as the parallel bar 102 of the crossbar 100. The proximal end 101 is bent at an angle so as to raise the parallel bar 102 to an acceptable height for receiving accessories as disclosed herein. The crossbar 100 is particularly suited for use with passenger vehicles that exhibit a reduced ground clearance. In one embodiment, the proximal end 101 is of a reduced circumference allowing for engagement in a smaller or lower capacity hitch receptacle such as, for example, a 1.5 inch hitch.

I claim:

1. A hitch accessory system comprising,
a crossbar including a perpendicular bar and a parallel bar; and
a crossbar insert capable of supporting at least one accessory,
wherein the perpendicular bar is capable of receiving and supporting the crossbar insert,
wherein one end of the parallel bar is adapted to engage a hitch receptacle,
wherein the accessory is a seat,
wherein the seat includes a mounting member on an underside of the seat, and
wherein the mounting member is adapted to engage a swivel member secured to a seat sleeve member.

2. The hitch accessory system of claim 1, wherein the seat sleeve member is adapted to engage the crossbar insert.

3. The hitch accessory system of claim 1, wherein the parallel bar includes a surface defining a recess capable of receiving a hitch safety pin for securing the crossbar within the hitch.

4. The hitch accessory system of claim 1, wherein the parallel bar includes a plurality of surfaces defining a plurality of recesses.

5. The hitch accessory system of claim 1, wherein the crossbar and crossbar insert are manufactured from steel, aluminum, or a combination thereof.

6. The hitch accessory system of claim 1, wherein the parallel bar of the crossbar is between about 20 inches and 60 inches in length.

7. The hitch accessory system of claim 1, wherein the perpendicular bar of the crossbar is between about 10 inches and 30 inches in length.

* * * * *